(12) United States Patent
Anderson et al.

(10) Patent No.: US 7,248,778 B1
(45) Date of Patent: Jul. 24, 2007

(54) AUTOMATED VIDEO EDITING SYSTEM AND METHOD

(75) Inventors: Glen J. Anderson, Sioux City, IA (US); Russell F. McKnight, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 958 days.

(21) Appl. No.: 09/809,819

(22) Filed: Mar. 16, 2001

(51) Int. Cl.
*H04N 5/93* (2006.01)
(52) U.S. Cl. ............................... 386/52; 386/46; 386/83
(58) Field of Classification Search .................... 386/1, 386/46, 52, 83, 96, 106, 126, 112, 125, 111; 360/31, 27, 72, 72.1, 72.2, 72.3, 13; 715/723; 709/218
See application file for complete search history.

(56) References Cited

U.S. PATENT DOCUMENTS

| | | | | |
|---|---|---|---|---|
| 4,685,003 A | * | 8/1987 | Westland | ...................... 386/52 |
| 5,237,648 A | | 8/1993 | Mills et al. | |
| 5,682,326 A | | 10/1997 | Klingler et al. | |
| 5,801,685 A | | 9/1998 | Miller et al. | |
| 5,819,004 A | * | 10/1998 | Azadegan et al. | .......... 386/112 |
| 5,835,667 A | * | 11/1998 | Wactlar et al. | ............... 386/106 |
| 5,956,453 A | | 9/1999 | Yaegash et al. | |
| 5,987,150 A | | 11/1999 | Coppinger | |
| 5,999,173 A | | 12/1999 | Ubillos | |
| 6,016,380 A | | 1/2000 | Norton | |
| 6,032,156 A | | 2/2000 | Marcus | |
| 6,034,679 A | | 3/2000 | McGrath | |
| 6,052,492 A | | 4/2000 | Bruckhaus | |
| 6,067,126 A | | 5/2000 | Alexander | |
| 6,351,765 B1 | * | 2/2002 | Pietropaolo et al. | ........ 709/218 |
| 6,597,859 B1 | * | 7/2003 | Leinhart et al. | .............. 386/95 |
| 6,628,303 B1 | * | 9/2003 | Foreman et al. | ............ 715/723 |

(Continued)

FOREIGN PATENT DOCUMENTS

AU 200025214 A1 10/2000

(Continued)

OTHER PUBLICATIONS

Immersion Into Visual Media: New Applcaitons of Image Understanding XP 000585056—Image Understanding—Feb. 1996—IEEE Expert Takeo Kanade, Robotics Institute, Carnegie Mellon University.

(Continued)

*Primary Examiner*—James J. Groody
*Assistant Examiner*—Christopher Onuaku
(74) *Attorney, Agent, or Firm*—Ross F. Hunt, Jr.; Stites & Harbison PLCC

(57) ABSTRACT

A video editing system uses simple heuristics and parameters on video footage to provide a condensed version of the footage. The editing system automatically provides either a finished condensed version of the footage or selects a plurality of clips based on the heuristics and parameters. The clips are optionally further edited by a user to produce a condensed version. The condensed version is transferable to any desired media suitable for storing video. A user interface enables the user to select heuristics to identify video clips from the footage. Parameters are also be set to automatically edit the clips in a desired manner. Temporal combinations of heuristics and parameters form templates, which are used to assemble desired clips for selected types of events.

27 Claims, 5 Drawing Sheets

U.S. PATENT DOCUMENTS 6,674,955 B2 * 1/2004 Matsui et al. ............... 386/52
6,807,362 B1 * 10/2004 Girgensohn et al. .......... 386/52

FOREIGN PATENT DOCUMENTS

| EP | 1026887 A2 | 8/2000 |
|----|------------|--------|
| JP | 04294694 | 10/1992 |

OTHER PUBLICATIONS

"Experience the Difference", *Copyright 2000 Dazzle Europe GmbH*, http://www.fast-multimedia.com/com/webd...gitalVideoEditingwithDVnow?opendocument, 1 page (Oct. 18, 2000).

"MediaStudio Pro Full Features, Key Features", www.ulead.com/msp/fullist.htm, 5 pages (Oct. 18, 2000).

"Strata Videoshop v4.5", http://www.strata3d.com, 2 pages (Oct. 18, 2000).

"Ulead VideoStudio Facts and Features List", www.ulead.com/vs/fullist.htm, 2 pages (Oct. 18, 2000).

"Ulead VideoStudio Key Features", http://www.ulead.com/vs/features2.html, 2 pages (Oct. 18, 2000).

Butler, S., "Film sequence generation strategies for automatic intelligent video editing (Abstract)", *Applied Artificial Intelligence*, vol. 11, No. 4, ISSN# 0883-9514, 1 page (Jun. 1997).

Luth, N., et al., "Syntactical and semantical description of video sequences (Abstract)", *Conference Paper: Eighth Working Conference on Database Semantics (DS-8)*, 1999, ISBN 0-7923-8405-9 Copyright 2000, IEE; Kluwer Academic Publishers, Norwell, MA, USA, 1 page, (Jan. 4-8, 1999).

Nack, F., et al., "Towards the Automated Editing of Theme-Oriented Video Sequences", *Applied Artificial Intelligence*, vol. 11, No. 4, Copyright 1997, IEE—Copyright Code 0883-9514-97/$12.00+.00, 331-336, (Jun. 1997).

\* cited by examiner

AUTOMATED VIDEO EDITING SYSTEM AND METHOD

FIELD OF THE INVENTION

The present invention relates to video editing, and in particular to automated video editing using a computer.

BACKGROUND OF THE INVENTION

Information overload is occurring in many different aspects of our lives. Many people have significant amounts of video footage of family events such as anniversaries, holidays and birthday parties. There is little time to sort through all the video footage accumulated over the years. There is a desire to share the footage with other family members, but no time to watch all of the footage. It would be desirable to be able to easily produce a condensed version of the footage for personal viewing and sharing.

One video editing system allows the editing of video footage. The system creates video editing lists that essentially are encoded editing decisions made by a user that can be applied against the video footage to create an editing video. Using such a system, a user can create a shorter version of the footage, retaining the best footage for viewing by other users. However, it can be very time consuming to edit several hours of video to provide a short highlight video to share with others.

There is a need for systems that can quickly and conveniently edit video footage to provide a highlight video or other short video that contains footage of interest. There is a further need for such a system that selects footage of interest, and does not exceed a user specified time limit or total byte size for the highlight video. There is yet a further need for a system that can allow a user to specify the type of footage desired to be included in the highlight video.

SUMMARY OF THE INVENTION

A video editing system uses heuristics and parameters on video footage to provide a condensed version of the footage. The editing system automatically provides either a finished condensed version of the footage or selects a plurality of clips based on the heuristics and parameters. The clips are optionally further edited by a user to produce a condensed version. The condensed version is transferable to any desired media suitable for storing video.

In one embodiment of the invention, an automated video editing user interface is provided. The interface enables the user to further edit video clips identified by application of the heuristics. The heuristics include but are not limited to dates of the year, various cues, such as people singing, or other image characteristics that are currently searchable from video, such as a soccer ball and net, baseball bats, skiing, or other desired heuristics. The user interface provides a visual representation of a sequence of frames from each clip, and an area for specification of parameters. Parameters include but are not limited to identifying total time for the condensed version, total byte size so that the condensed version fits on desired medium, transitions between clips, time per clip, background music for each clip, what part of a clip to cut off for a given length of time and others.

In a further embodiment, a template is used to produce the condensed video. The template is based on a generic event, such as a wedding or birthday party. The template contains a temporally ordered set of heuristics and parameters representative of an ordered sequence of video clips. Use of a template provides a consistent manner in which to create a highlight video of predetermined events. They are generated by a user, or obtained from other users and developers from a website or other source.

The system also provides the ability to produce a low quality preview video with an interface that allows for tasks, such as lengthen a clip, shorten a clip, eliminate a clip, and search for an alternative clip. Several iterations of preview videos are created and edited prior to creating a final higher quality highlight video.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

A computer system on which the invention is implemented is first described, followed by description of a software system that generates condensed versions, or highlight videos from video footage. The video footage is processed by the software system based on heuristics and parameters.

Figure 1:
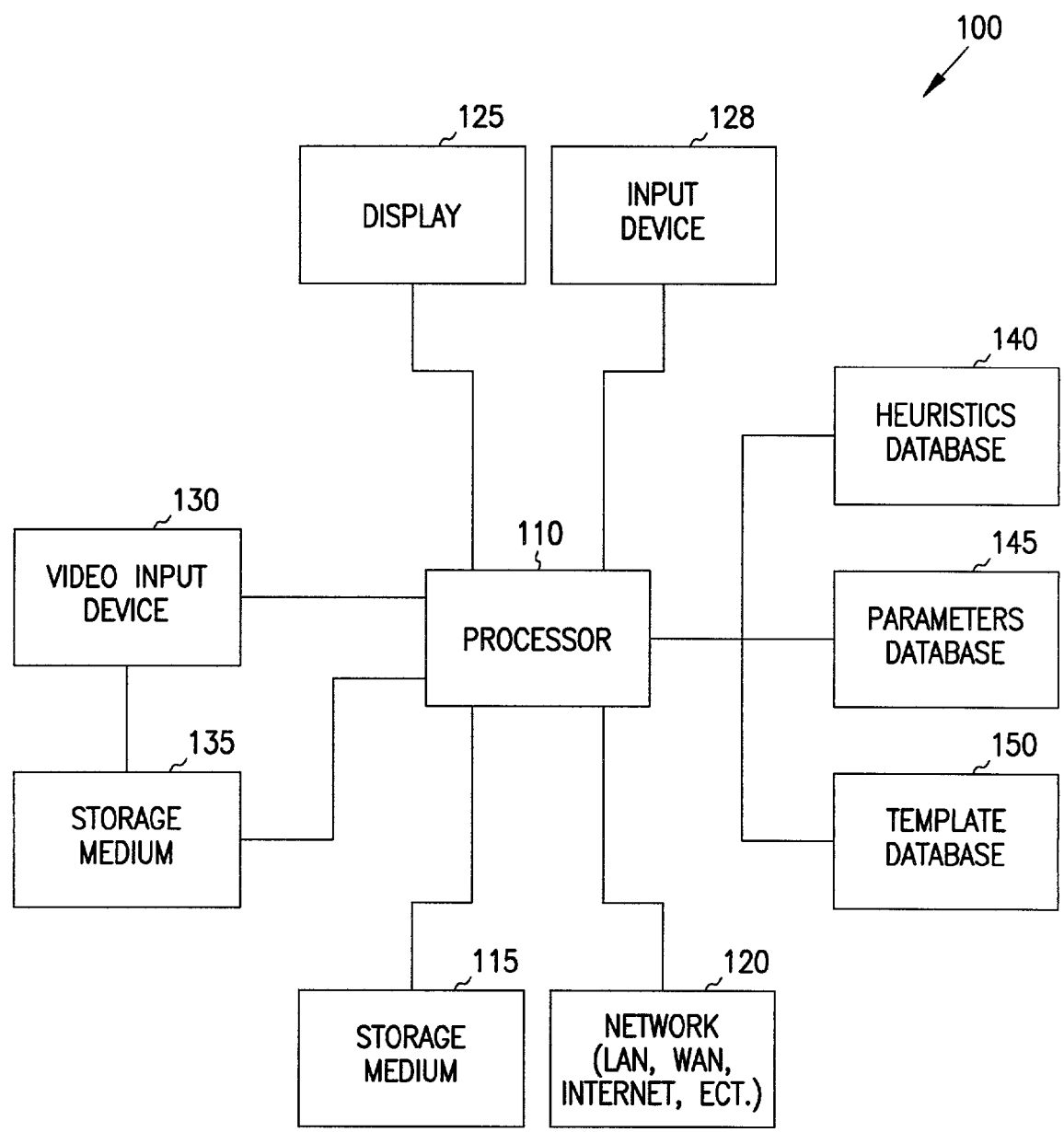
FIG. 1 is a block diagram of a computer system incorporating video editing functions of the present invention.

FIG. 1 shows a block diagram of a computer system 100 according to the present invention. In this embodiment, a processor 110 is a microprocessor such as a 486-type chip, a Pentium®, Pentium® II, Pentium® III, Pentium® 4, or other suitable microprocessor. The block representing processor 110 is also used to represent main memory, such as random-access memory of between 16 MB and 256 MB or more of data, optional caches, controllers and other components. The processor 110 and components are integrated into a single integrated circuit or as parts of a circuit board such as a system board in a personal computer. Processor 110 in one embodiment is an appliance, such as a personal digital assistant or other intelligent appliance. Main memory includes standard DRAM (Dynamic Random-Access Memory), EDO (Extended Data Out) DRAM, SDRAM (Synchronous DRAM), or other suitable memory technology. Processor 110 is coupled to a storage medium 115, such as a disk drive device, CDROM (Compact Disk-Read-Only Memory) drives, DVD (Digital Video Disk) drives, video-cassette recorders, or TBU (Tape-Backup Unit) devices for storing computer programs and data for use by processor 110. Processor 110 is also coupled to a network 120 such as a local area network, wide area network, Internet or other network. The connection to the network may be hardwired, or wireless using one of many wireless protocols.

A display device is also coupled to processor 110 and provides a user with a view of information being processed. A keyboard or other input device 128 is also coupled to processor 110 to provide for user interaction with computer system 100.

Processor 110 is coupled to a video input device 130 such as a camera, camcorder or other image capturing device. A storage medium 135 is coupled to the input device and optionally directly to the processor 110. The storage medium 135 comprises memory stick/cards, tape, removable drives or other large capacity storage medium. It can store and provide data to and from the video input device 130, or in other embodiments, directly to the processor 110.

Processor 110 is also coupled to multiple databases, which are logically represented at heuristics database 140, parameters database 145 and template database 150. The databases may be stored on storage medium 115, or on other storage systems coupled via network connection 120. Further devices are coupled to processor 110 as desired to create high speed computer systems, or fewer devices are coupled to create low cost appliance like device. Such an appliance comprises video input device 130 in one embodiment, where the elements of computer system 100 are integrated therein.

Figure 2:
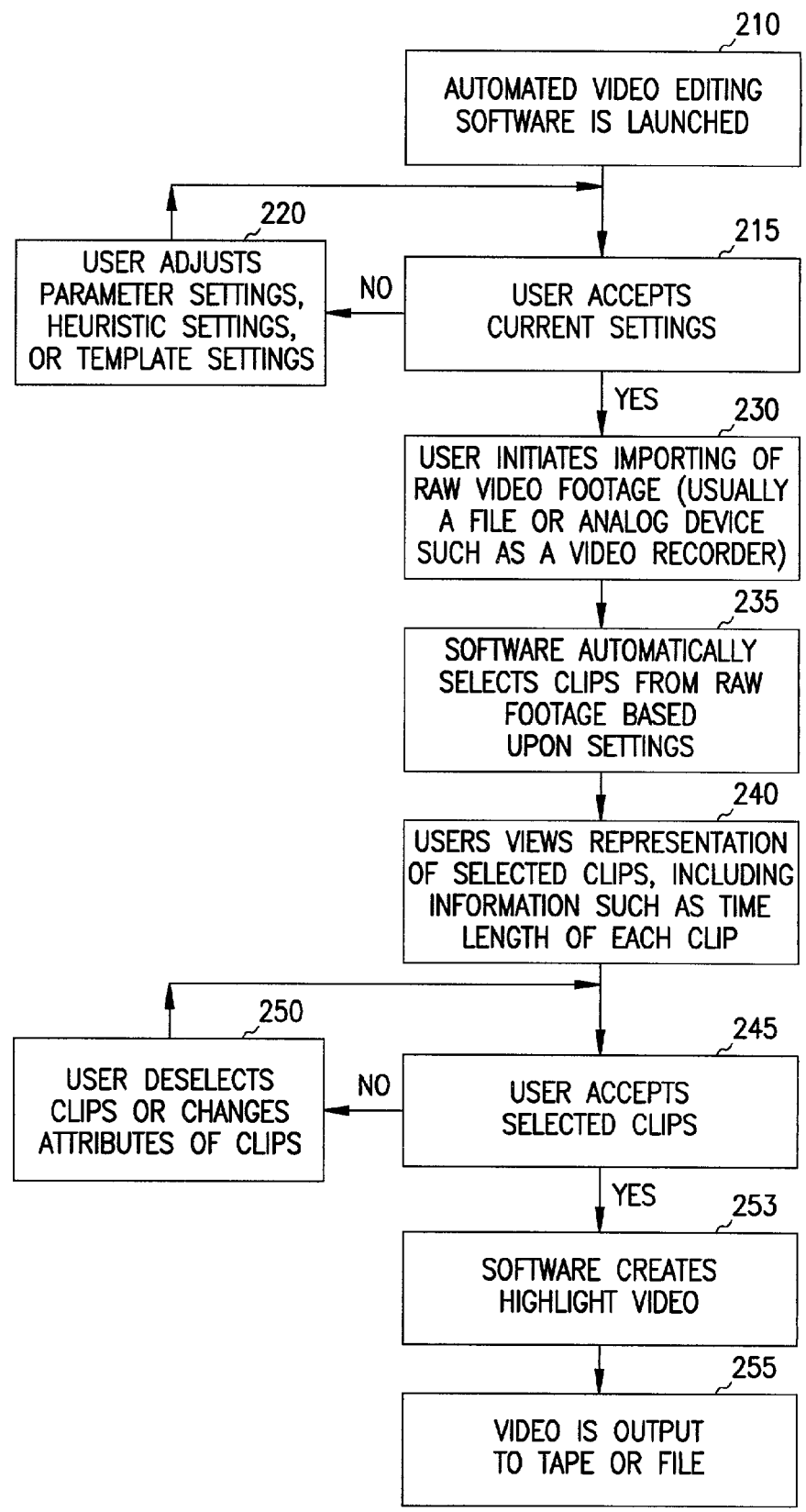
FIG. 2 is a flowchart of user interaction with video editing software executing on the computer system of FIG. 1.
Figure 3:
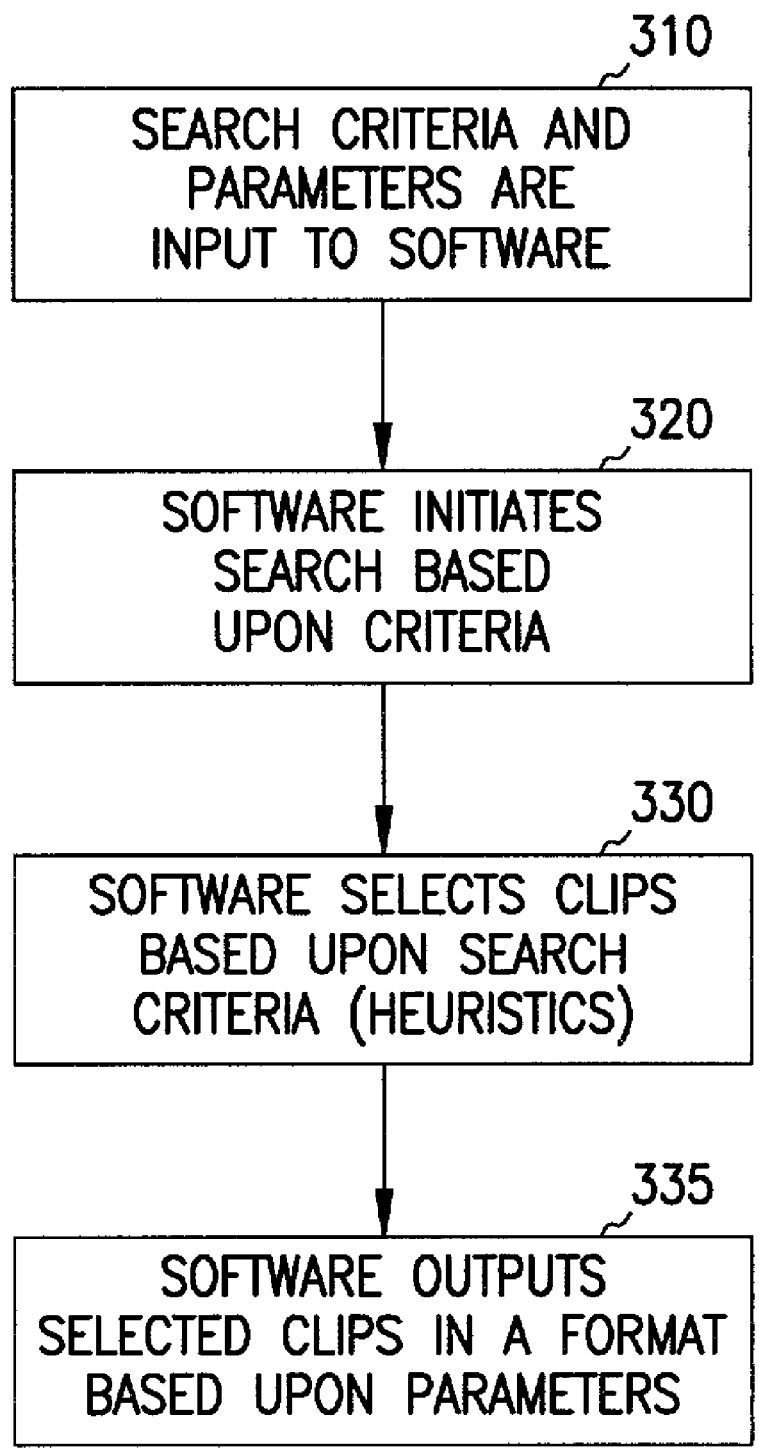
FIG. 3 is a flowchart of automated selection of video clips by the video editing software.

The software system that generates condensed versions, or highlight videos from video footage is represented in flowchart form in FIGS. 2 and 3. A representation of a displayed user interface is described with reference to FIG. 4. The software system executes on computer system 100. Software for the system is stored on computer readable medium. In one embodiment the software is stored on secondary storage, such as a disk drive and loaded into main memory and cache as needed. The software is written in the form of modules that generally provide a single function or subsets of related functions. However, in various embodiments, the software comprises a single module or many modules, and there is no requirement that functions be grouped together. Hardware and/or firmware is used to implement the invention in further embodiments. Video footage is provided via any desired medium, such as analog or digital videocassette, DVD, disk drive, cable modem, or other medium compatible with computer system 100.

In FIG. 2, the software system is launched at 210 by retrieving software from memory and making it available to processor 102 for execution. At 215 and 220, a user may adjust parameter settings, heuristic settings or template settings and accept them. Heuristics are generally search criteria, queries or other constructs used to identify desired clips. In one embodiment, the heuristics comprise a neural net program that monitors previous user selection of clips for inclusion in the condensed video, and learns from such selections. It then attempts to create queries that identify clips that the user would normally select. Parameters generally are used in the construction of the condensed video. They identify such things as the total footage desired, transitions between clips, clip quality and background music to name a few. At 230, a user or other entity initiates importing of raw video footage such as a file or from an analog device such as a video recorder or other medium as indicated above. If the video is already stored on the computer system memory, no importation of it is required.

Once the video footage is available, the software system automatically selects clips from raw footage based upon the settings at 235. The selected clips may be viewed at 240. Such viewing may include information such as the time length of each clip. At 245, the user is able to accept selected clips. At 250, the user is also able to deselect or reject clips, and to change attributes of the clip, such as shorten the length of time of the clip. When attributes have been changed, the user may again decide to accept the clip at 245. When all desired clips are accepted, the software system creates the highlight video from the clips at 253 and outputs the highlight video to secondary storage 255, such as tape or files stored on persistent media.

In one embodiment, the settings comprise templates, which are predetermined temporal sets of parameters and heuristics designed to identify and order clips for a designated type of event, such as a wedding, funeral or sporting event. Templates may be created by users, or by others and downloaded from websites if desired and selected at 215. An example might include the standard shots or scenes taken by a photographer at a wedding, such as arrival of the wedding party at the church, seating of the parents, procession of the wedding party down the isle, procession of the groom and bride, introduction by the clergy, statements by the bride and groom, the pronouncement of marriage, etc. The template may use parameters to identify the length of each of these different types of clips, and to screen out lower quality video, such as video in which the camera was jittering, out of focus, or panned too fast. Parameters may also be used to establish segues, light levels, audio levels, and to provide text and background music if desired.

FIG. 3 is a flowchart of the search process used by the software system to identify clips in accordance with search criteria and parameter settings. At 310, the search criteria and parameters are input into the software system. These may be based on templates, or may be independently generated by a user. For instance, when creating a highlight video from the footage of a soccer game, which could run over an hour, one may wish to search for shots of the goal when the soccer ball is moving near the goal. In one embodiment of the invention, the system uses search criteria to identify higher levels of sound, corresponding to applause or cheering. Further, a highlight video could be selected for each player in the game by looking for particular jersey numbers or faces in conjunction with the ball to identify footage when each player was in action. The system uses software routines to search data for particular sounds, colors, textures, etc. If people singing a birthday song create a distinctive enough profile, corresponding video clips are identified using the profile.

Upon receipt of the settings, the software initiates a search based on the search criteria at 320. Clips are selected based on the search criteria, referred to as heuristics at 330. When the clips are selected, the parameters are used to modify the clips, including screening out some clips and changing the length of other clips. Further common video editing actions may also be controlled by the parameters. The selected clips are then outputted in a format based upon the parameters at 335. In one embodiment, the condensed video is automatically created based on initial user selections such that the user simply initiates loading of the video footage into the computer and waits for the finished condensed video to be provided by the computer without further user interaction required.

Figure 4:
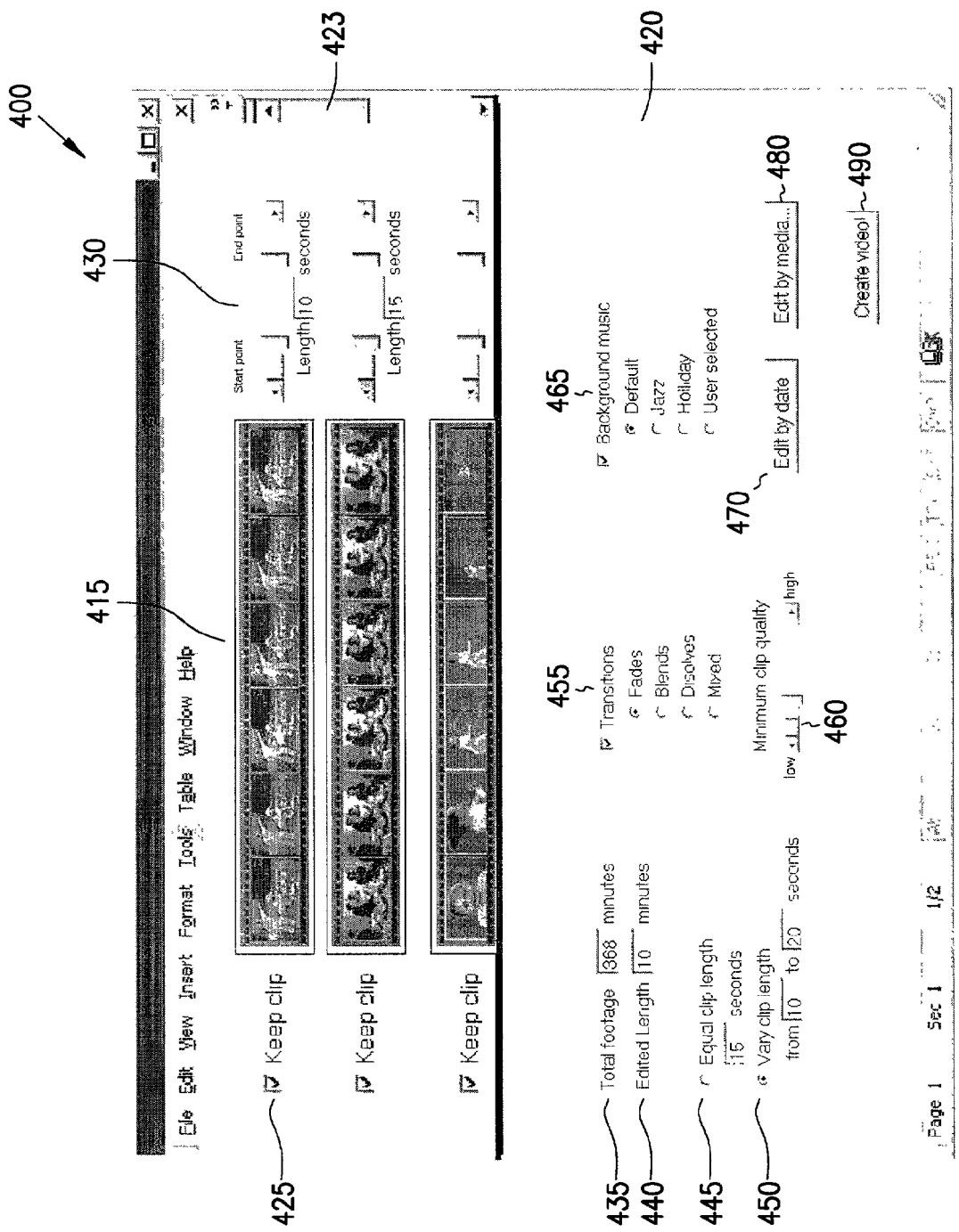
FIG. 4 is a diagram of a user interface for selecting clips and modifying parameter settings to be applied to the clips.

FIG. 4 is a representation of a user interface 400 provided by the software system for viewing representations of selected video clips 415 on a display, and several mechanisms providing for interaction with the user to specify parameters at 420. While the video may be assembled as above in accordance with the flowchart of FIG. 3, user interface 400 provides the ability of the user to further edit the clips selected for the condensed video prior to them being assembled into the condensed video.

Three clips are shown at 415 as represented by sequences of frames that are spaced over the length of the clip. Further clips are viewable by using standard navigational features such as slide bar 423. A standard menu bar is also provided at the top of the interface 400 window.

A "keep clip" check box 425 is provided for each clip to enable the user to select whether or not to keep the corresponding clip in the condensed version of the video footage. A mechanism such as a double slider bar 430 is provided for each video clip. Bar 430, or other suitable interface construct, enables the user to graphically select the length of the clip, indicated as 10 seconds for the first clip, and to modify the starting and ending points for the clip. As the starting and ending points for a clip are adjusted, the sequence of frames is changed in one embodiment to reflect the new start and end points. The displayed length of the video clip may be directly set by the user, or may be set through modification of the start and end points.

The parameters portion 420 of the interface 400 provides the ability to select parameters to apply while forming the condensed version of the video footage. The length of the raw footage is indicated at 435 as 368 minutes, and the edited length of the video is indicated as 10 minutes at 440. The user may select an equal length for the clips at check box 445, or may select to vary the clip length at 450 between two entered values, such as 10 and 20 seconds. The lengths may also be varied to be much shorter and much longer as desired. Transitions or segues between the clips are specified at 455. The transitions include, but are not limited to fades, blends, dissolves and mixed. Many others may be included, including those not yet discovered.

Further parameters include a sliding bar 460 to select a minimum clip quality. Lower quality video clip indicators include rapid panning, which can be measured by tacking various reference points in video footage and measuring the rate at which those reference points are displaced. The more rapid the displacement, the lower the video quality. Other factors may be similarly included, such as focus and jitter.

Background music is specified by use of check buttons 465. Default music may be selected, as well as jazz, holiday or other user selected music. Still further parameters include buttons for editing of clip selections by date 470, edit by media 480 and create video 490. Editing by date 470 provides the user the ability to select a date for clips, while editing by media 480 provides the ability to perform selection of clips based upon a multimedia search, such as by people singing a particular song. Create video button 490 initiates the creation of the condensed version of the footage, comprising the selected clips, which are assembled in accordance with the chosen parameters. An option may be provided from the create video button 490 to create a preview video of lower quality. This could be created more quickly than a final higher quality video, and allow for faster processing. Using the preview video option would facilitate in iterative process of modifying parameters and viewing preview versions prior to creating the final version of the highlight video.

Figure 5:
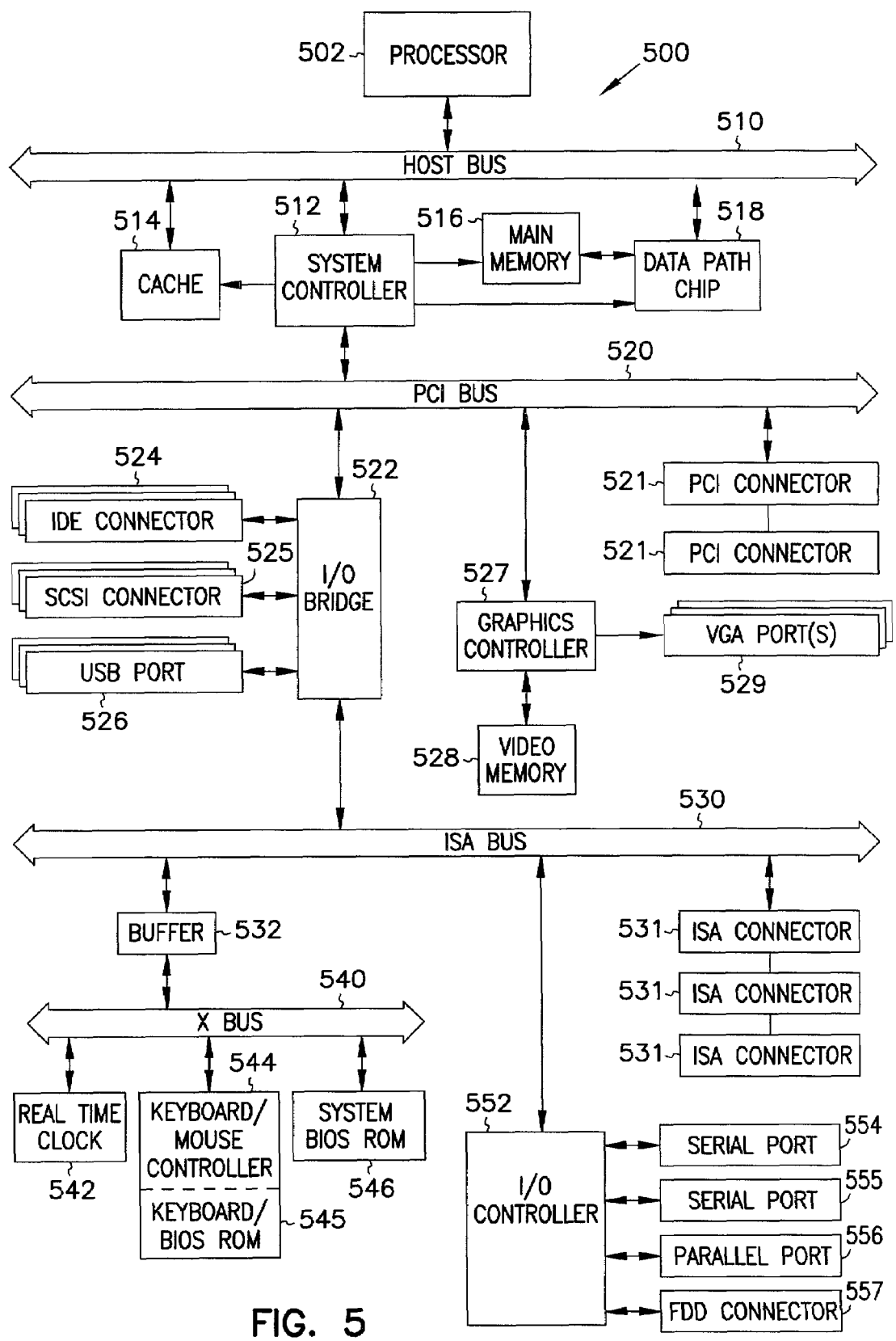
FIG. 5 is a detailed block diagram of a computer system incorporating video editing functions of the present invention.

FIG. 5 shows a more detailed block diagram of a personal computer system 500 according to the present invention. In this embodiment, a processor 502, a system controller 512, a cache 514, and a data-path chip 518 are each coupled to a host bus 510. Processor 502 is a microprocessor such as a 486-type chip, a Pentium®, Pentium II®, PentiumIII®, Pentium®4, or other suitable microprocessor. Cache 514 provides high-speed local-memory data (in one embodiment, for example, 512 kB of data) for processor 502, and is controlled by system controller 512, which loads cache 514 with data that is expected to be used soon after the data is placed in cache 512 (i.e., in the near future). Main memory 516 is coupled between system controller 514 and data-path chip 518, and in one embodiment, provides random-access memory of between 16 MB and 128 MB of data. In one embodiment, main memory 516 is provided on SIMMs (Single In-line Memory Modules), while in another embodiment, main memory 516 is provided on DIMMs (Dual In-line Memory Modules), each of which plugs into suitable sockets provided on a motherboard holding many of the other components shown in FIG. 5. Main memory 516 includes standard DRAM (Dynamic Random-Access Memory), EDO (Extended Data Out) DRAM, SDRAM (Synchronous DRAM), or other suitable memory technology. System controller 512 controls PCI (Peripheral Component Interconnect) bus 520, a local bus for system 500 that provides a high-speed data path between processor 502 and various peripheral devices, such as graphics devices, storage drives, network cabling, etc. Data-path chip 518 is also controlled by system controller 512 to assist in routing data between main memory 516, host bus 510, and PCI bus 520.

In one embodiment, PCI bus 520 provides a 32-bit-wide data path that runs at 33 MHz. In another embodiment, PCI bus 520 provides a 64-bit-wide data path that runs at 33 MHz. In yet other embodiments, PCI bus 520 provides 32-bit-wide or 64-bit-wide data paths that runs at higher speeds. In one embodiment, PCI bus 520 provides connectivity to I/O bridge 522, graphics controller 527, and one or more PCI connectors 521 (i.e., sockets into which a card edge may be inserted), each of which accepts a standard PCI card. In one embodiment, I/O bridge 522 and graphics controller 527 are each integrated on the motherboard along with system controller 512, in order to avoid a board-connector-board signal-crossing interface and thus provide better speed and reliability. In the embodiment shown, graphics controller 527 is coupled to a video memory 528 (that includes memory such as DRAM, EDO DRAM, SDRAM, or VRAM (Video Random-Access Memory)), and drives VGA (Video Graphics Adaptor) port 529. VGA port 529 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 521.

In one embodiment, I/O bridge 522 is a chip that provides connection and control to one or more independent IDE connectors 524–525, to a USB (Universal Serial Bus) port 526, and to ISA (Industry Standard Architecture) bus 530. In this embodiment, IDE connector 524 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 524 are provided, and each provide the EIDE (Enhanced IDE) architecture. In the embodiment shown, SCSI (Small Computer System Interface) connector 525 provides connectivity for up to seven or fifteen SCSI-type devices (depending on the version of SCSI supported by the embodiment). In one embodiment, I/O bridge 522 provides ISA bus 530 having one or more ISA connectors 531 (in one embodiment, three connectors are provided). In one embodiment, ISA bus 530 is coupled to I/O controller 552, which in turn provides connections to two serial ports 554 and 555, parallel port 556, and FDD (Floppy-Disk Drive) connector 557. In one embodiment, ISA bus 530 is connected to buffer 532, which is connected to X bus 540, which provides connections to real-time clock 542, keyboard/mouse controller 544 and keyboard BIOS ROM (Basic Input/Output System Read-Only Memory) 545, and to system BIOS ROM 546.

CONCLUSION

A method and system has been described that automatically generates a condensed version of video from video footage. Clips for the condensed version are identified using heuristics for video queries. Parameters are applied to the selected clips to provide the condensed version of the footage. The editing system automatically provides either a finished condensed version of the footage or selects a plurality of clips based on the heuristics and parameters. The clips may be edited by applying user specified parameters to produce the condensed version. The condensed version may be transferred to any desired media suitable for storing video.

A user interface provides the ability of the user to adjust various settings to alter an acceptable quality level, pick transitions between clips, select background music, and adjust other settings or parameters as desired. Clips may be cut off based on detected sounds. Dates of the year may be specified in order to obtain highlights of birthdays or other holidays. By iteratively adjusting the settings after each version of condensed video is reviewed, the user can easily personalize the video to reflect personal taste and preference. The iterative versions may also be lower quality preview movies to expedite the iterative process, saving the higher quality pass for the finished condensed video.

Templates may be used to create a condensed version of video for predetermined events, such as weddings. The templates are temporal combinations of heuristics and parameters representative of an event. When applied to video footage, the template results in searching of the video for predetermined types of clips specified by the heuristics, and then provides parameters that when applied to clips identified by the searching, provides a condensed highlight version of the video footage.

The invention claimed is:

1. A computer implemented method of creating a condensed video from video footage, the method comprising:
   receiving heuristics representative of desired video clips;
   identifying video clips from the video footage based on the heuristics;
   tracking reference points in the identified video clips and measuring rates at which the reference points are displaced; and
   applying parameters to the identified clips to provide the condensed video,
   said method further comprising specifying, in response to a minimum quality setting by a user provided by entering the minimum quality setting into a computer interface, a minimum quality level for the video clips, examining all of said video clips, using a computer, to determine whether the video clips meet the minimum quality level based on the measured rates at which the reference points are displaced, rejecting the examined clips not meeting the minimum quality level and selecting only from the video clips remaining after rejecting the clips not meeting the minimum quality level in creating the condensed video.

2. The method of claim 1 further comprising specifying a variable clip length.

3. The method of claim 1 further comprising identifying a transition style to be applied between clips.

4. The method of claim 1 further comprising specifying background music for the condensed version of the video footage.

5. The method of claim 1 further comprising displaying a plurality of frames representative of a clip from the beginning of the clip to the end of the clip.

6. The method of claim 5 wherein the beginning and end of a clip may be changed by a user, and wherein the plurality of frames representative of the clip are adjusted corresponding to such changed beginning and end.

7. The method of claim 6 wherein a double slider is provided for changing the beginning and end of a clip.

8. The method of claim 1, wherein said computer interface includes a sliding bar mechanism for receiving said user provided minimum quality setting.

9. A system for creating a condensed video from video footage, the system
   comprising:
      means for receiving heuristics representative of desired video clips;
      means for identifying video clips from the video footage based on the heuristics;
      means for applying parameters to the identified clips to provide the condensed video,
   said method further comprising displaying a plurality of frames representative of a clip from the beginning of the clip to the end of the clip,
   wherein the beginning and end of a clip may be changed by a user, and wherein the plurality of frames representative of the clip are adjusted corresponding to such changed beginning and end, and
   wherein a user interface including a double slider is provided for enabling the user to change the beginning and end of a clip based on the settings of the double slider.

10. A system for creating a condensed video from video footage, the system comprising:
   a module that receives heuristics representative of desired video clips;
   a module that identifies video clips from the video footage based on the heuristics; and
   a module that iteratively applies parameters to the identified clips to provide the condensed video, said parameters including a minimum quality level for the clips specified in response to a minimum value setting by a user set by using a sliding bar in a user interface, and said system rejecting clips are examined by the system to determine whether they meet the minimum quality level and the examined clips not meeting the minimum quality level.

11. A computer readable medium having instructions to cause a computer to execute a computer implemented method of creating a condensed video from video footage, the method comprising:
   receiving a set of heuristics representative of desired video clips;
   identifying video clips from the video footage based on the heuristics;
   tracking reference points in said identified video clips and measuring rates at which said reference points are displaced; and
   iteratively applying parameters to the identified clips to provide the condensed video, said parameters including a minimum quality level of clips specified in response to a minimum quality setting by a user so that video clips are examined, using a computer, to determine whether they meet the minimum quality level based on the measured rates at which the reference points are displaced, to reject the examined clips not meeting the minimum quality level, and to exclude the rejected clips in the condensed video, said method further comprising selecting only from the video clips remaining after rejecting of the clips not meeting the minimum quality level in creating the condensed video.

12. A system for creating a condensed video from video footage, the system comprising:
   a storage medium that receives a plurality of clips from video footage;
   an interface for receiving an indication of a desired length for condensed video; and
   a module that generates the condensed video from the clips such that the length of the condensed video is substantially equal to the desired length,
   the interface receiving an indication specifying background music for the condensed version of the video footage and the interface further receiving an indication specifying, in response to a minimum quality setting for the clips set by a user, a corresponding minimum quality level for the clips; and
   a module that tracks reference points in said condensed video and measures rates at which said reference points are displaced so that video clips are examined by the system to determine whether they meet the minimum quality level based on the measured rates at which the reference points are displaced and the examined clips not meeting the minimum quality level are not selected for the condensed video and so that in creating the condensed video selection is made from only the video clips remaining after rejecting the clips not meeting the minimum quality level.

13. The system of claim 12 wherein the interface further receives an indication of a variable clip length.

14. The system of claim 12 wherein the interface further receives an indication of a transition style to be applied between clips.

15. The system of claim 12 further comprising a display for displaying a plurality of frames representative of a clip from the beginning of the clip to the end of the clip.

16. The system of claim 15 wherein the beginning and end of a clip may be changed by a user, and wherein the plurality of frames representative of the clip are adjusted corresponding to such changed beginning and end.

17. The system of claim 16 wherein a double slider is provided for changing the beginning and end of a clip.

18. The system of claim 12, wherein said interface includes a sliding bar mechanism for receiving said user set minimum quality.

19. A computer implemented method of creating a condensed video, the method comprising:
   receiving a plurality of clips from video footage; and
   displaying a plurality of frames representative of a clip from the beginning of the clip to the end of the clip wherein the beginning and end of a clip may be changed by a user, wherein the plurality of frames representative of the clip are adjusted corresponding to such changed beginning and end and wherein a double slider is provided for changing the beginning and end of a clip.

20. A system for providing a user the ability to edit video clips, the system comprising:
   a display representative of each of the clips, along with a user selectable option of keeping individual clips so as to provide a plurality of kept clips;
   a mechanism to adjust the starting and ending points of the clips; and
   an interface to facilitate multiple parameter selections to apply to the kept individual clips, the interface providing a parameter setting for specifying a minimum quality level for the clips in response to a minimum quality setting by a user using a sliding bar so that video clips are examined by the system to determine whether they meet the minimum quality level and the examined clips not meeting said minimum quality level are not included in a final condensed video.

21. The system of claim 20 wherein the interface provides a user selectable option of creating a video from the video clips based on the selected parameters.

22. The system of claim 20 wherein the interface provides a parameter setting for varying the length of clips between user defined time periods.

23. The system of claim 20 wherein the interface provides a parameter setting for identifying a transition style to be applied between all clips.

24. The system of claim 20 wherein the interface provides a parameter setting for specifying a minimum quality level for the clips.

25. A computer implemented method of generating an event specific condensed video from video footage of the event, the method comprising:
   identifying plural sets of heuristics, each set identifying a desired type of clip from the event;
   specifying a temporal order to the plural sets of heuristics;
   specifying at least one parameter to apply to clips identified by application of the heuristics to the video footage of the event, said at least one parameter comprising a minimum quality level for the clips in response to a minimum quality level setting by a user provided by entering the minimum quality setting into a computer interface of a computer;
   tracking reference points in said identified clips and measuring rates at which said reference points are displaced; and
   using the computer to determine whether the identified clips meet the minimum quality level based on the measured rates at which the reference points are displaced, rejecting the examined clips not meeting said minimum quality level, and excluding the rejected clips from the condensed video and so that in creating the condensed video selection is made from only the video clips remaining after rejecting the clips not meeting the minimum quality level.

26. A system for creating a condensed video from video footage, the system comprising:
   a computer housing;
   a processor mounted in the computer housing;
   memory coupled to the processor;
   a system bus coupled to the processor;
   a display device coupled to the processor;
   a module executing on the processor that receives a set of heuristics representative of desired video clips;

a module executing on the processor that identifies video clips from the video footage based on the heuristics; and a module executing on the processor that iteratively applies parameters to the identified clips to provide the condensed video, said parameters including a minimum quality level for the clips specified in response to a minimum quality setting by a user, said module tracking reference points is said identified video clips and measuring rates at which said reference points are displaced, so that video clips are examined by the system to determine whether the examined video clips meet said minimum quality level based on the measured rates at which the reference points are displaced, and so that examined video clips not meeting said minimum quality level are rejected and not included in the condensed video, and so that in creating the condensed video selection is made from only the video clips remaining after rejecting the clips not meeting the minimum quality level.

27. An interface for a system for providing a user the ability to edit video clips, the interface comprising:

a display representative of each of the clips, along with a user selectable option of keeping individual clips to provide a plurality of kept clips;

a mechanism to adjust the starting and ending points of the clips; and a mechanism for multiple parameter selections to apply to the kept individual clips, said multiple parameter selections including a minimum quality level for the clips specified in response to a minimum quality setting by a user so that the kept clips are examined by the interface to determine whether the examined clips meet the minimum quality level and the examined clips not meeting said minimum quality level are not included in a final condensed video, and said mechanism for multiple parameter selections including a sliding bar for enabling the user to make the minimum quality setting.

* * * * *